AUTOMATIC PRINT TIMER

Filed June 25, 1957 4 Sheets-Sheet 1

INVENTORS
THOMAS P. DIXON
SAMUEL E. HOWSE
BY Lyon & Lyon
ATTORNEYS

July 28, 1959 T. P. DIXON ET AL 2,897,259

AUTOMATIC PRINT TIMER

Filed June 25, 1957 4 Sheets-Sheet 2

INVENTORS
THOMAS P. DIXON
SAMUEL E. HOWSE
BY Lyon & Lyon
ATTORNEYS

AUTOMATIC PRINT TIMER

INVENTORS
THOMAS P. DIXON
SAMUEL E. HOWSE
BY Lyon & Lyon
ATTORNEYS

INVENTORS
THOMAS P. DIXON
SAMUEL E. HOWSE
BY Lyon & Lyon
ATTORNEYS

United States Patent Office 2,897,259

Patented July 28, 1959

2,897,259

AUTOMATIC PRINT TIMER

Thomas P. Dixon, Los Angeles, and Samuel E. Howse, Glendale, Calif., assignors to Technicolor Corporation, Hollywood, Calif., a corporation of Maine Application June 25, 1957, Serial No. 667,856

10 Claims. (Cl. 178—5.2)

This invention relates to electronic apparatus for obtaining the parameters required to reproduce positive pictures from negatives and, more particularly, to improvements therein.

In an application for Printing Timer, filed June 16, 1954, Serial No. 437,258, by William E. Evans et al., now Patent No. 2,863,938, issued December 9, 1958, which is assigned to this assignee, there has been described and claimed the printing timer. In this printing timer application, signals representative of the optical transmission of discrete areas of different color-image-aspect negatives, for example, are generated and are applied to separate channels. Each channel contains appratus for converting these signals to density-representative signals. The average level of the density-representative signal is then established by a controllable peak-clipping circuit. The peak-clipping circuit output is applied to a linear contrast-control amplifier whose gain is controllable. The output of the linear amplifier is applied to a photo-curve amplifier, which modifies the signals applied to it in accordance with the desired relationship between density and cathode-ray tube screen brightness, and, also, to compensate for nonlinearities in the brightness-transfer characteristics of a cathode-ray tube employed at the output. Each of these cathode-ray tubes has a screen phosphor, the color of which provides an additive color component corresponding to the color represented by the image aspect associated with the channel.

The images on the cathode-ray tube screens are superimposed to present a composite picture in color. The brightness range of reproduction of each color, and thereby the contrast of the composite picture, is controlled by varying the gain of the linear amplifier. The brightness of each color, and thereby the color balance of the picture, is controlled by clipping the reference signals in each channel at different levels with the peak-clipping circuit. Calibrated indicators are associated with each of these circuits so that, after varying these controls to establish a picture having a desired color balance and contrast, the calibrations may be read to provide information as to the proper contrast and printer-light illumination required to provide a positive photographic print having substantially the same contrast and color balance. To simulate in the electronically presented positive picture the effects of overlap in the color characteristic of the dyes used to make the positive print, means were provided in the form of a resistor network which interconnected each channel for the purpose of feeding signals therebetween.

The printing timer is employed for the most part in providing information for printing motion-picture positives from reels of negatives of film. Thus, it becomes necessary to record the parameters derived for every change in scene that occurs throughout the reel of film. The reel is then transported to the laboratory, wherein the exposure of positive film through the negative takes place in accordance with the information derived from the printing timer. In production operation, it frequently happens that sections of duplicate negative material are cut into the original negative at numerous places throughout a reel. Almost invariably, the color characteristics of the duplicate negative require substantially different settings of the printer-light-control knob than are required for the adjacent sections of the original negative for producing a print in which the negative differences are indistinguishable. The practice has been for the operator to adjust the controls for proper rendition of the original negative material, as indicated on the cathode-ray tube apparatus in the form of a positive picture in color. The operator then, in advancing the reel, comes into the duplicate negative section and makes the settings for that section. To check his work, he then goes back to the original negative material and then resets the controls. This may go on several times. Time, therefore, is consumed in the usual operation of the printing timer. Also, because of the time required for the operator to reset the controls manually each time, his impression of the picture from the preceding section of negative is lost and he is not able to obtain the best possible match in color quality between adjacent sections. Further, in the transfer of data from printer-control settings onto paper, errors in reading do occur.

It is an object of the present invention to provide a printing timer of the type described which can be operated more rapidly than heretofore.

It is another object of the present invention to provide a printing timer of the type described which automatically records the printing-timer control settings.

Yet another object of the present invention is the provision of a novel and improved printing-timer apparatus.

Still another object of the present invention is the provision of printing-timer apparatus of the type described wherein the printing timer can be automatically operated from data previously recorded by it.

These and other objects of the present invention are achieved by providing a printing timer wherein the scene-to-scene settings of the printer-light controls are recorded on magnetic tape or other information-storage media, so that the transitions between scenes and from duplicate to original negatives can rapidly be made automatically. The recording medium may be rerun through the printing timer, and the various different settings of the printer-light controls are automatically adjusted in accordance with the information stored on the recording medium. This affords the opportunity of judging the scene-to-scene adjustments under viewing conditions and may be thought of as the first "answer print" inspection.

The apparatus in accordance with this invention includes a printing timer wherein the color brightness of a negative displayed as a positive on the cathode-ray tube apparatus is adjusted for each color channel by varying the value of the operating potentials applied to the phototube which serves to provide to the channel, signals representative of the point-by-point light transmission of the negative. Effectively, the variation of the operating potentials applied to the phototube has the same effect as adjusting the printer-light controls in that the brightness level of the color for which that channel provides an output may thereby be varied. Means are provided for coding the various level settings available over the range and when the picture displayed on the cathode-ray tube apparatus has a desired appearance, then the code representing the level selected is recorded on a recording medium.

Means are provided for advancing this recording medium each time a scene is changed, since the negative film has a small conduction band positioned thereon each time the scene changes, whereby such change of scene may be sensed. For playback purposes, means are provided whereby upon reading the data which has been recorded on the recording medium the operating potentials of the phototube may be controlled accordingly. In this manner, an entire reel may be played back and the settings selected varied automatically, whereby a check of the entire operation may be made rapidly. Changes may be easily done, since enough room is left in the recording medium for stopping at any point where it is desired to change the data which has been recorded on the medium.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 6:
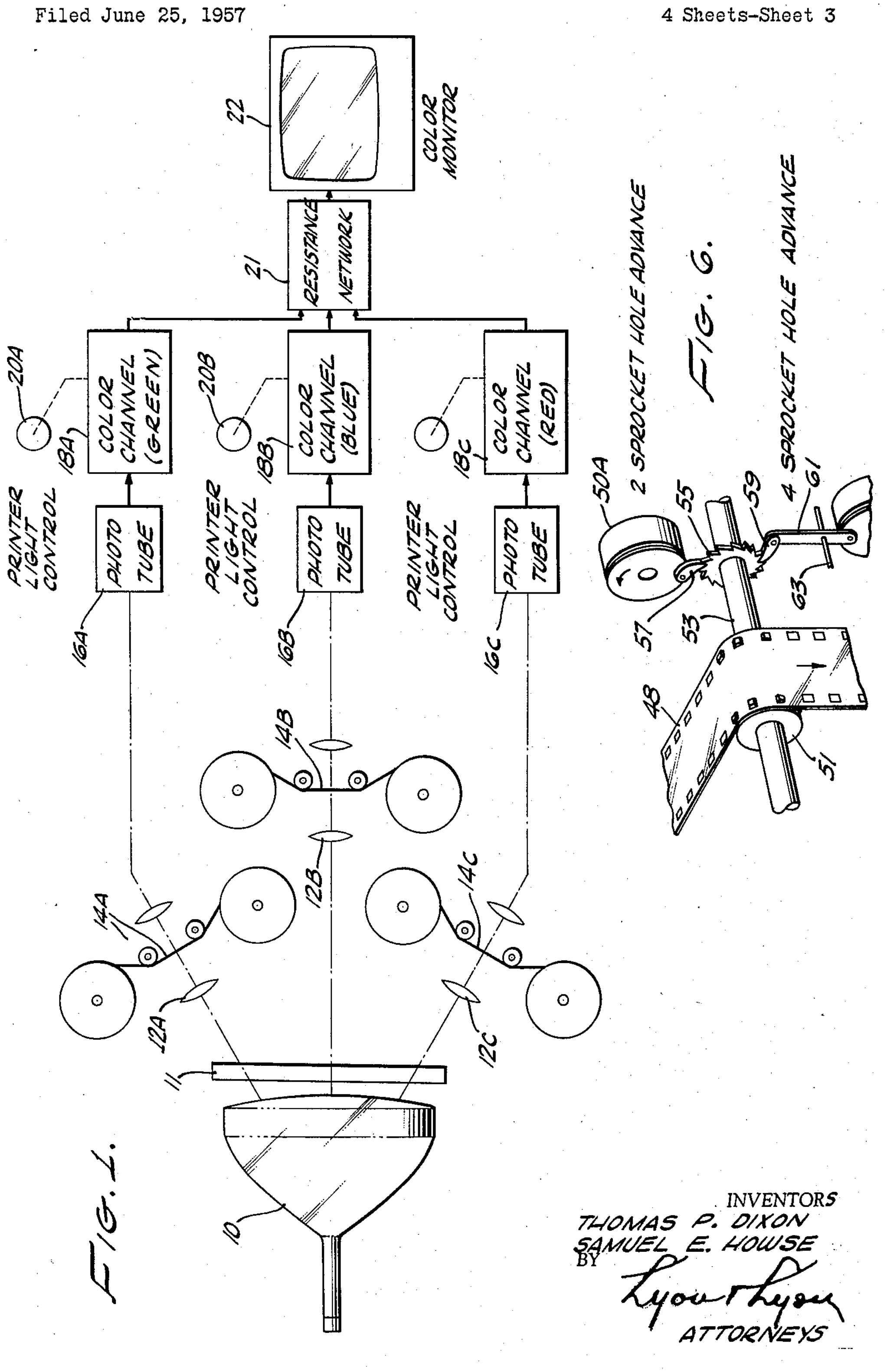
Figure 1 is a general block diagram of the type of printing timer apparatus described in the Evans et al. application, which is shown to enable a better understanding of this invention.
Figure 6 is a diagrammatic perspective view of the tape-advancing mechanism.

Referring now to Figure 1, there is shown a block diagram of a printing timer of the type upon which this invention is an improvement. This printing timer is shown in order to facilitate an understanding of the invention, as well as an explanation thereof. This printing timer is shown in more detail, described, and claimed in the above-noted application to Evans et al., and an improvement thereon is shown, described, and claimed in an application by this inventor, Serial. No. 501,162, filed April 13, 1955, for a Printing Timer.

The printing timer in general comprises a source of illumination for either three negatives where the three-strip color process is employed, or for a single negative where the single color-negative process is employed. The source of illumination comprises a flying-spot scanner tube 10 or cathode-ray tube, which has its cathode-ray beam deflected in order to present a scanning raster of illumination. A beam-splitting optical system 11 splits the illumination received from the cathode-ray tube into three light beams which are then passed through three correcting lenses 12A, 12B, 12C to the three separation negatives 14A, 14B, 14C. A phototube 16A, 16B, 16C at the front end of each color channel 18A, 18B, 18C generates an electrical signal in response to the light transmission through the respective negatives, which represents such light transmission. In each channel, as described in detail in the above-noted printing-timer applications, there are nonlinear amplifiers which convert the light-transmission-representative signal to a density-representative signal. Means are provided for setting the average response level of the channel to the signal received from the phototube, whereby the color brightness seen at the output of the channel is varied. This is here represented as a knob 20A, 20B, 20C, which, for each channel, is labeled "printer-light control." Also, means are provided for setting the response range whereby the contrast of the color seen at the output of the color channel is controlled.

The output of the three color channels is applied to cathode-ray tube apparatus, here designated as a color monitor 22. This may either be a single color tube or, preferably, three tubes each having a primary color phosphor, or a white phosphor with a color filter, with means for superimposing and viewing the three pictures as one. The degrading effects of dye overlaps in the positive print are electrically simulated by providing a resistance network 21 for cross-feeding signals between the various channels. The net result is that the positive picture seen closely resembles a positive print which can be made providing the parameters which are simulated electrically can be duplicated chemically in the positive print. This is successfully achieved since the selection of the cathode-ray tube color phosphors or filters is made such as to present substantially the same color output as can be obtained from the positive-print stock.

In the Evans et al. application noted above, the color brightness which represents the printer-light brightness is varied by varying a pedestal clipper which sets the level of the pedestal of the video signal provided from the phototube to a channel. In the improved printing timer application by Dixon noted above, the color brightness and the printing light level are established by varying the amplitude of the video-signal output from the phototube. In the present invention, color brightness is proposed to be varied by varying the operating potential applied to the phototube. Since the signal level at the phototube is directly proportional to negative transmittance, setting the signal-level amplitude is analogous to setting the brightness of the printer lamp. Setting the operating potentials being applied to a phototube is a method for directly controlling the signal-level output of the phototube. Thus, any means for controlling this phototube operating voltage may be calibrated directly in the printer-light levels. It should be noted, however, that the selection of the arrangement for varying the color brightness herein is not to be construed as a limitation upon the invention, since the principles are applicable to other arrangements for varying color brightness, such as those described in the previous Evans et al. and Dixon applications.

Figure 2:
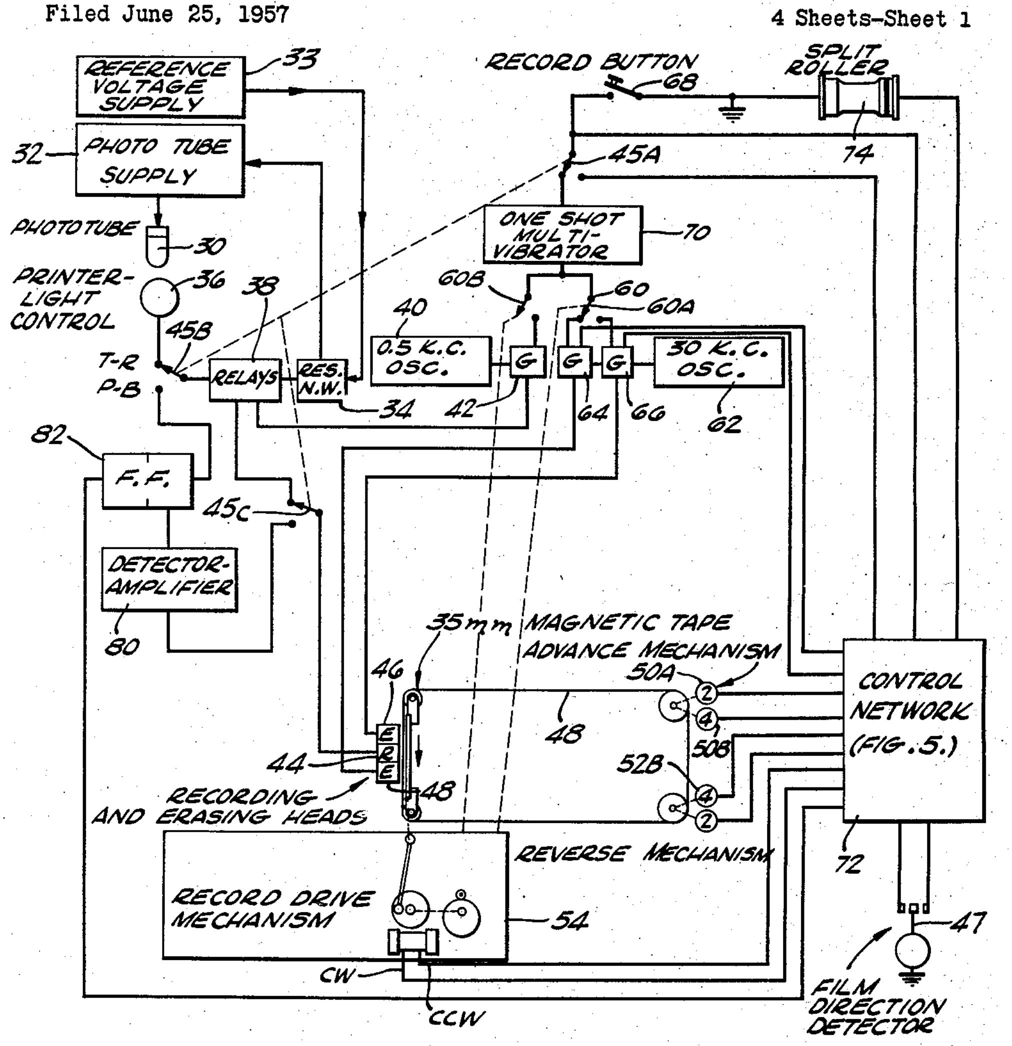
Figure 2 is a block diagram of the invention.

Reference is now made to Figure 2, which is a block diagram of the invention. The diagram in Figure 2 shows the invention being applied to a single one of the three color channels. This is done in order to maintain simplicity in the drawings and render the explanation more readily understood. Certain portions of the apparatus shown in Figure 2 are common to the three color channels. These will be so designated when they are described. Thus, referring to Figure 2, each color channel contains a phototube 30, which receives operating potentials from a phototube supply source 32. The voltage output of this supply is determined by the amount of reference voltage that is applied to it from a reference-voltage supply 33 through a resistor-control network 34. A six-deck 52-position rotary selector switch 36 has the sliding arm of each deck (shown in Figure 3) connected to a separate double-pole, double-throw relay, all six of which are represented by the rectangle 38. One pole of each relay is employed to insert and remove resistors from the network 34 in such a manner as to produce approximately linear voltage increments from the reference-voltage supply to the phototube supply source of operating potential as the knob controlling the rotary-selector switch 36 is rotated from a minimum to a maximum position. This action produces approximately linear-voltage increments in the operating potential of the phototube.

As indicated above, the variation of the phototube operating potential is used to control the level of video signal output of the phototube. Since the level of the phototube signal is directly proportional to negative transmittance, varying its average level is analogous to varying the brightness of the printer lamp. The various selector-switch positions, therefore, may be calibrated directly in printer-light units. The second pole of each relay is used to connect a recording signal from a 0.5 kc. source 40 through a gate 42 to a corresponding channel in the eighteen-channel recording head 44.

A three-pole double-throw switch 45A, 45B, 45C, in one position, designated as the T–R, or time-record position enables a recording of the printer-light level selected. In the other position, designated as P–B, or playback position, automatic playback of the data recorded when in the time-record position can be carried out. Recording of selected printer light levels is done on a tape loop 48. This consists of a loop of 35 millimeter magnetic tape which has the usual sprocket holes found in 35 millimeter film. There is one tape loop used for all three channels. Since there are six signals to be recorded from the six relays in each channel, an 18-channel recording head 44 is required, thus establishing 18 separate tracks or channels on the magnetic tape for recording the digital code data from each one of the three channels representing the printer-light level selected for the desired positive color picture on the cathode-ray tube apparatus. An erase head is positioned on either side of the recording head. These comprise an upper erase head 46 and a lower erase head 48. The reasons for requiring two erase heads for one recording head will be found in the subsequent description herein.

Timing data for each scene on the motion-picture reel are recorded on a two-perforation length of the tape 48. The direction of tape movement is controlled by a set of contacts 47 that sense the direction of movement of the reel of negative film, being processed on the negative timer, through the scanner aperture (not shown) for the negative timer. Recording is done with the tape-direction-control mechanism 50A, 50B, 52A, 52B in a fixed position. The tape itself is reciprocally moved past the recording heads by record drive apparatus 54. If the operator has been winding through a roll of film in a forward direction, the tape loop 48 will have been progressing in a clockwise direction as the film progressed from scene to scene. The area of the tape, therefore, that is ready to be recorded upon will lie midway between the record head 44 and the upper erase head 46. The distance between the gaps in the record and erase heads is approximately one inch. When the record button 68 is pressed, the record-drive mechanism 54 will rotate one revolution in a clockwise direction. The radius to the crank journal on the record-drive mechanism 54 is approximately the same as the distance between the gaps of the record head 44 and the erase heads 46 and 48. As may be visualized in the diagram in Figure 2, a clockwise motion of the record-drive mechanism 54 will move the two-perforation length of tape that is to be recorded upon past the upper erase head 46 in its first 90° of travel. During the second 90° of travel, the tape will be moved down over the upper erase head 46 to its original position. During the third 90° of rotation, the freshly-erased area will be moved down over the record head 44. The tape will then move, during the last 90° of crank rotation, back up over the record head 44 to its original position. Similarly, if the tape had last been moved in a counterclockwise direction, such that the area to be recorded upon would lie midway between the record head 44 and the lower erase head 48, when the record button 68 is pressed, the record-drive mechanism 54 will rotate one revolution in a counterclockwise direction. As it rotates, the area of tape to be recorded upon will move down over the lower erase head 48, up over the lower erase head 48, up over the record head 44, and down over the record head 44 to its original position. This complete cycle of operation is performed in less than a second of time.

The erase and recording signals to the heads are gated on and off at the appropriate time by cam-operated switches 60, which are driven mechanically from the record drive mechanism 54. The switches 60 are timed such that a two-perforation length of tape allotted for each recording is completely erased by the two passes past the erase head occurring immediately before recording, and the recorded information is spaced well within the erased area. Erasing current is obtained from a 30 kc. source 62, which is connected through the two gates 64, 66 to the upper and lower erase heads 46, 48. These gates 64, 66 have a time constant sufficiently long to permit the erase current to die exponentially over a period of several cycles to insure against leaving a small magnetized area on the tape which may interfere with the recorded data.

The recording operation is performed by placing the switch 45 in the time-record position. The printer-light controls are then adjusted until the color picture seen on the cathode-ray tube apparatus has a desired appearance, then a record button 68, which is common to all three channels, is depressed. This operates a one-shot multivibrator 70, which then provides an output which exists during the entire record cycle. Thus, the necessity for holding down the record button is eliminated. The output of the one-shot multivibrator is sufficient to open any one of the normally closed gates 42, 64, 66 when the cam-operated switch 60 connects this output to these gates. The output of the record button is also applied to the control network 72 to energize the record drive mechanism 54 to move the tape in the proper direction for recording. The direction in which the tape is moved by the record-drive mechanism is determined by the last previous motion of the tape. This is stored by the control network 72 and the tape motion is established accordingly when the record button is depressed.

Thus, assume that a previous clockwise tape motion has left the next area to be recorded between the recording head and the upper erase head 46. Upon pressing the record button 68, the record drive mechanism 54 will move the recording area upward past the upper erase head, then downward again past the upper erase head, continuing past the recording head and then back past the recording head to the starting position. During the time the tape is being moved past the upper erase head, contact 60A of the cam switch 60 is cam operated from the record drive mechanism 54 to connect output from the one-shot multivibrator 70 to gate 66 so that the upper erasing head receives an erasing signal. During the time the tape is moved past the recording head, contact 60B of the cam-operated switch connects output from the one-shot multivibrator 70 to open gate 42, whereby the printer-light setting selected may be recorded.

Assuming a previous counterclockwise tape motion has left the next area to be recorded between the recording head and the lower erase head, then the tape motion following a pressing of the record button will carry this area past the lower erasing head and then in reverse past the recording head and then back to the starting position. This time, cam-operated switch contact 60A enables the lower erase head to receive an erasing signal while the area to be recorded passes thereunder, and switch contact 60B enables the recording head to be energized while the area to be recorded passes thereunder.

The negative film material being processed by the printing timer passes over a split roller 74, which consists of a roller having two halves insulatingly separated. The beginning of a new scene or film spliced into the original negative is marked by a small conduction strip at the edge of the film, bridging the film space between a scene change. This conduction strip bridges the split halves of the split roller 74, enabling conduction therebetween. Thus, the scene change is sensed and ground is connected over the split roller to the control network 72.

The scene change signal is used by the control network 72 to advance the magnetic tape. The direction that the magnetic tape is to take is determined by the direction that the negative film has taken. The film-direction detector 47 is used to determine whether the tape should be advanced in a clockwise or a counterclockwise direction. As previously indicated, such detector consists of a single-pole, double-throw set of contacts where the movable contact is connected through a clutch to the film drive sprocket.

If the film is advanced in a forward direction to arrive at a scene which was previously timed and then continued to be advanced, the scene change signal will cause a rotary solenoid 50A to rotate and advance the tape two perforations in a clockwise direction. However, if the negative film has been driven backwards in arriving at the previous scene and is now made to travel in a forward direction as the scene-change signal is detected by the split roller, the rotary solenoid 50B is energized which causes the tape to be advanced four tape perforations in a clockwise direction. Reversing the sequence of film movement from the two conditions just described will cause a reversal in the action of the tape-advance mechanism by selectively energizing either the two-perforation solenoid 52A or the four-perforation solenoid 52B.

To summarize the operation of the apparatus described thus far, the color brightness of the color produced by each color channel is varied by selecting one out of 52 positions on a rotary selector switch which produces a resultant color image that most nearly matches a standard scene having the desired color characteristics. The brightness variations are achieved by varying resistors in the circuit providing operating potentials to the phototube in each channel. The resistor variation is achieved by varying the pattern of operated and unoperated condition of six relays for each channel. This pattern forms a unique digital code for each of the 52 positions of the selector switch. When the desired color picture is achieved, then a record button is pushed, which causes a single-revolution clutch to move the area of a magnetic tape employed for recording the digital data past the recording head. The tape itself is not advanced, merely reciprocated past the recording head. The tape is erased as it is reciprocated, and then recorded upon. As the reel of negative film is advanced, a scene change is sensed by a split roller. As a result of sensing the scene change, tape-advance mechanism is actuated to advance the tape to the next recording position. The direction of motion of the reel of negative film is sensed, and each time a scene change is sensed, the tape is advanced or moved backwards in accordance with the previously sensed direction of motion of the negative film, so that there is always correspondence between the recorded data and the scene for which it was recorded. Obviously, the tape is marked at the outset to indicate the point from which a beginning of the recordings of the printer-light timing data will be made.

For the purpose of playback, switch 45 is moved to the playback position. The tape motion follows the direction the negative film in the printing timer is moved. The motion-sensing mechanism is the same as was described previously. The tape stops after it is moved into the position where correspondence exists between the recorded data and the scene being scanned by the phototubes. The outputs from the reading head are applied to detector amplifiers 80 (one for each of the 18 channels of the recording head). Each one of these will or will not provide an output pulse, depending upon the pattern of the voltages recorded representative of the pattern of relay operation. These pulses are applied from the detector amplifiers to succeeding flip-flop circuits 82 (one for each channel of the recording head) and thereafter the flip-flop circuits assume the pattern dictated by the recorded code. Each one of the flip-flop circuits, when operated, operates a corresponding one of the relays 38, so that the relays will assume the pattern dictated by the recorded data. This, of course, operates the resistor control networks 34 to apply the same operating potentials as were applied to the phototubes when the record button was pressed. Thus, the automatic playback of the data which has been recorded causes the color in the output of each one of the color channels to be identical with what it was when the acceptable printer-light settings were recorded.

It should be noted that the one-shot multivibrator 70 is not activated at this time. Therefore, neither the erase gates 64, 66 nor the record gate 42 are opened. It should further be noted that the relays serve as a form of memory maintaining the color brightness at the selected level until a scene change occurs, at which time the relays are reset to the new selected color brightness level. Thus, a continuous reading of the data representative of the color brightness or printer-light setting for a scene is not required. In view of the arrangements for keeping the magnetic tape movement synchronous with the scene changes, an entire reel may be reviewed or the operation may be such as to shift back and forth between scenes as desired. The operation may also be stopped, where another setting is desired to avoid excessive color changes between scenes, and another recording may be made over the previous data in the manner described previously.

The tape loop on which a recording has been made for a reel may be removed for the purpose of subsequently providing outputs which can be employed for controlling the printer-light level when positive stock is exposed, or well-known apparatus may transfer the data on the tape loop to punched cards or other tape, so that the record of exposure from the master negative may be preserved for subsequent reprint operations.

Figures 3, 4:
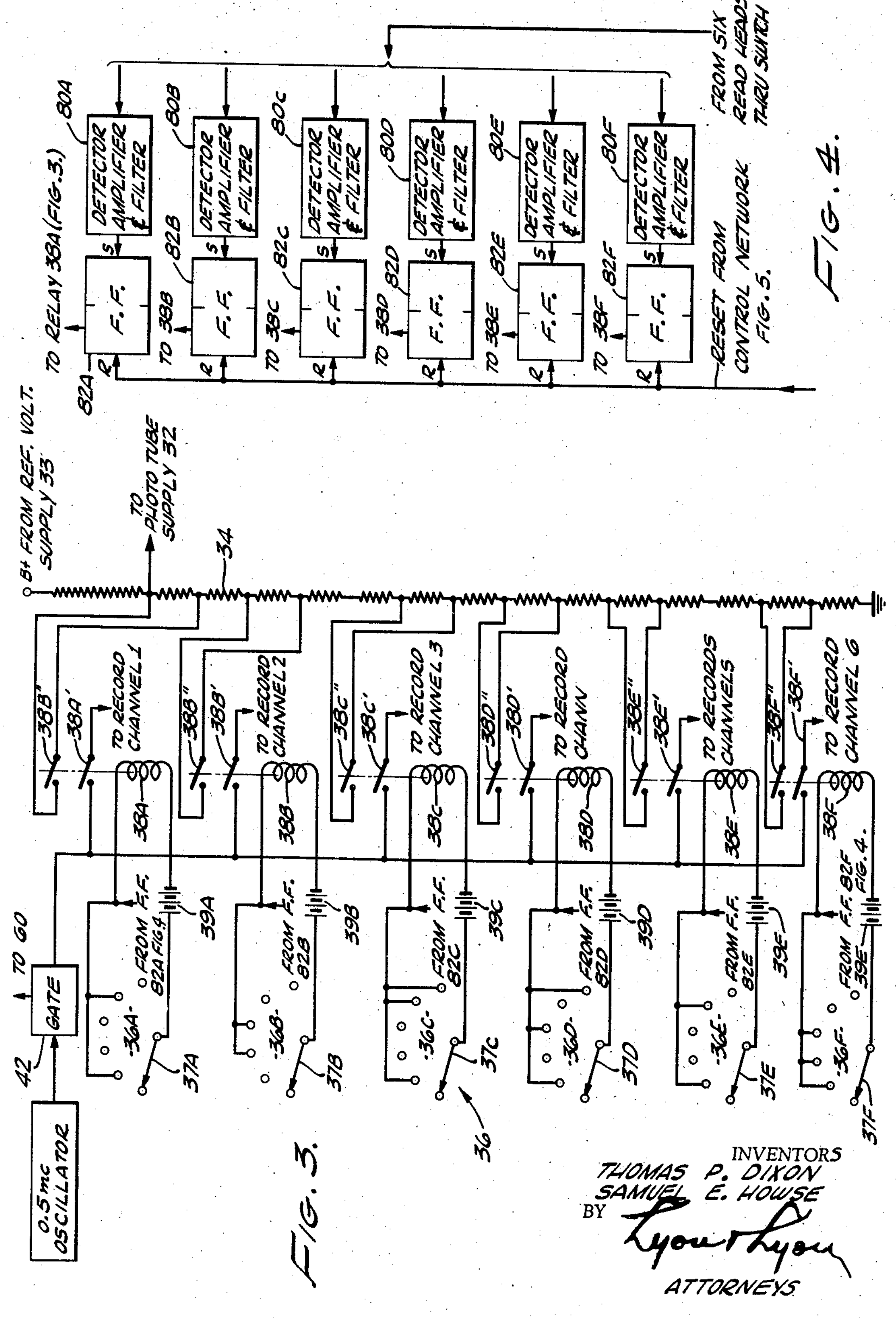
Figure 3 is a circuit diagram of the printer-light control used in the embodiment of the invention.
Figure 4 is a block diagram of the playback apparatus used in the embodiment of the invention.

Figure 3 is a schematic diagram showing an example of a method of wiring a selector switch to control the operating potentials of the phototube 30 and at the same time operating the relays 38 to establish a digital code representative of the color-brightness level selected. The selector switch 36 has six levels 36A through 36F. The slider arms 37A through 37F at each level are each connected through a source of potential 39A through 39F to relay coils 38A through 38F. The other side of the relay coils are selectively connected to the contacts of the particular deck with which their slider arms are associated in a manner so that for each setting of the slider arm a unique operating pattern of these relays is presented. One such unique pattern arrangement may be to use the relays as binary-representative devices and assign binary numbers from 000000 to 100100 (52). Obviously, when a relay is not operated, it will represent zero; when it is operated, it will represent one.

Each relay has at least two contacts, respectively designated as 38A′, 38A″ through 38F′, 38F″.

The contacts 38A″ through 38F″ are connected to short out resistors which are connected into the potential divider 34. This potential divider 34 corresponds to the resistor network 34, shown in Figure 2. This potential divider 34 is connected across the source of potential shown as the reference-voltage supply 33 in Figure 2. It will thus be seen that depending upon the pattern of operation of the relays, resistors are selectively shorted out and the potentials applied to the phototube supply 32 are varied accordingly. The potential from the resistor network 34 is applied to the control grid of the regulator amplifier tube in the phototube supply 32 so as to cause the output of the phototube supply to vary directly with the variation in potential from the resistor network. The phototube supply 32 is of the well-known series-regulated type, and is available commercially from many sources. Thus, the gain of the phototube, or the value of its signal output, may be controlled. The response over the range of control may be made to vary either linearly or nonlinearly with the positions of the selector switch 36 by the value selected for the various resistors in the voltage divider 34.

The other one of the contacts 38A′ through 38F′ of the relays have one side connected to the respective channels of the recording head 44. The other side of these contacts are all connected to the gate 42 shown in Figure 2, which receives oscillations from the 0.5 kc. oscillator 40. This gate 42 is opened only when the cam switch 60 is operated and the one-shot multivibrator 70 has been energized. It should thus be apparent that the pattern of the relay operation determines which channels of the recording head receive signals when a recording is made and which ones do not.

Figure 4 is a block diagram of the playback apparatus. It will be recalled from Figure 2 that for each color channel this consists of six detector amplifiers 80A through 80F, which receive the output of the six channels of the recording head for that color channel. The six detector amplifiers are respectively connected to six flip-flops 82A through 82F. The outputs of the six channels of the recording head are detected, amplified, and filtered in well-known manner, and provide a resultant pulse pattern representative of the digital code which has been recorded. The flip-flops 82A through 82F are respectively driven or not in accordance with this pulse pattern by the six detector amplifiers 80A through 80F. These flip-flops will be set or not as the result of the drives received when the tape 48 is read at the beginning of a scene. Each one of the flip-flops 82A through 82F is respectively connected to each one of the relay coils 38A through 38F. The flip-flops which are set will energize these relays, whereby their contacts are closed to duplicate the operating potential being applied to the phototube 30, which was recorded at the time on the tape. The output of the split roller 74, which detects the onset of the next scene, is differentiated and applied to the flip-flops 82A through 82F to reset them immediately before the tape is advanced to a new position. As the tape is advanced, the data are read from it, and a new voltage pattern is established which is translated by the relays into operating potentials for the phototube 30.

Figure 5:
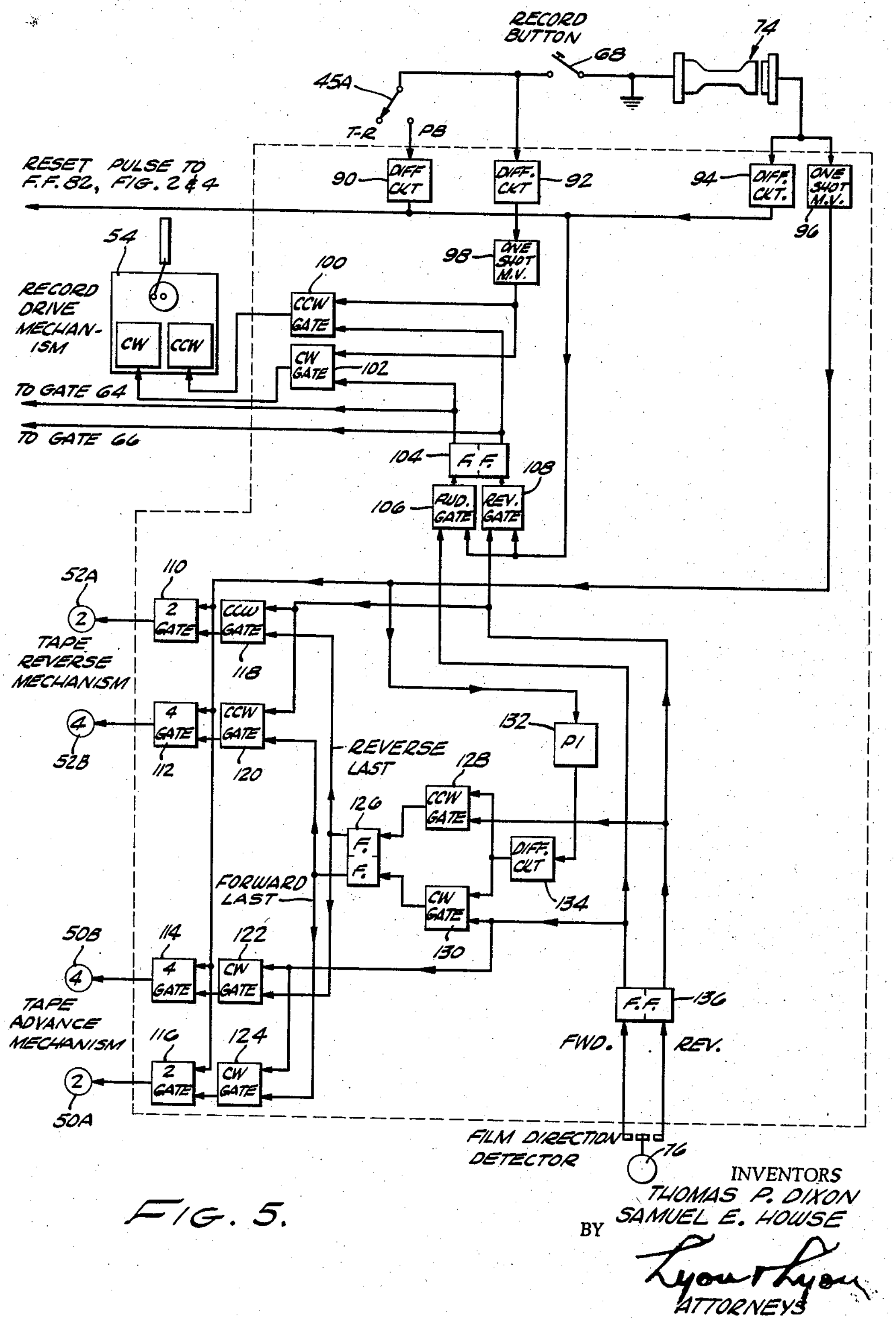
Figure 5 is a block diagram of control network apparatus employed in the embodiment of the invention.

Figure 5 is a block diagram of the apparatus in the control network 72. The components shown within the dashed lines make up the control network 72. The components shown outside the dashed lines are those described earlier in this application and illustrated in Figure 2.

It will be recalled that the tape loop is advanced by means of rotary solenoids 50A, 50B, 52A, 52B in such a way as always to maintain correspondence between the proper area on the tape and the film scene in the timer aperture. It will be further recalled that there are four possible combinations of film movement, each requiring a different amount or direction of tape movement in order to maintain this correspondence. In the case where the film was last moved in a forward direction through a scene change and is continued to be advanced as the next conducting strip passes over the split roller, it is necessary for tape-advance mechanism 50A to be energized to advance the tape two perforations in a clockwise direction. The direction that the film is moving is sensed by film-direction detector 76. The film-direction flip-flop 136 is energized by the film-direction detector 76, and remains in that state of conduction until the direction of film motion is reversed. It is desired always to store the information on the direction that the film was moving through a scene change until after the following scene change is moved through the timer aperture. This information is stored in direction-memory flip-flop 126. Because, in this first example, the film was moving in a forward direction at the time of the last scene change, the left-hand side of direction flip-flop 136 was energized, thereby applying a voltage to open clockwise gate 130. As the conducting strip on the film passed over the split roller 74, the one-shot multivibrator 96 was energized. The pulse from this one-shot multivibrator was inverted in phase-inverter 132 and was differentiated by differentiating circuit 134. It is desirable to invert the phase of the pulse before differentiating it and applying it to direction-memory flip-flop 126 so that the flip-flop will be triggered by the trailing edge of the pulse rather than by its leading edge. Using the trailing edge of the pulse permits the tape-transporting cycle to be completed before the state of conduction of direction-memory flip-flop 126 is changed. In this first example, the inverted, differentiated pulse from the split-roller one-shot multivibrator 96 is applied through the clockwise gate 130, which is being held open by the voltage from direction flip-flop 136, to the lower half of direction-memory flip-flop 126. The voltage from the lower half of this flip-flop is applied simultaneously to gates 120 and 124. This establishes the action that will be permitted to take place as a result of the film having been moved in a forward direction, at the last scene change. Because the film is now also travelling in a forward direction at the present scene change, a voltage from the left side of direction flip-flop 136 is applied to gate 124, which has applied also the voltage from direction-memory of flip-flop 126. Clockwise gate 124 is open, therefore, and its output voltage is applied to open the two-perforation-advance gate 116. As the conducting strip passes over the split roller 74, the one-shot multivibrator 96 applies a pulse through the two-perforation-advance gate 116 to the two-perforation-advance mechanism 50A. This pulse is made long enough to fully energize the rotary solenoid 50A and complete the movement of the tape.

If the film now is moved in a reverse direction, the right side of direction flip-flop 136 will be energized. Its output is applied simultaneously to gates 118, 120, and 128. Because the lower half of direction-memory flip-flop 126 is still energized, its output will cause counterclockwise gate 120 to be opened, which will, in turn, open the four-perforation tape-reverse gate 112. As the next conducting strip passes over the split roller 74, a pulse from the one-shot multivibrator 96 is applied through gate 112 to actuate the four-perforation tape-reverse mechanism 52B. At the time that the trailing edge of the pulse occurs, its inverted, differentiated edge is applied through gate 128, which is being held open by direction flip-flop 136, to energize the top half of direction-memory flip-flop 126. Energizing the top half of this flip-flop establishes one condition for proper tape movement at the next scene change.

The foregoing description covers two of the four possible conditions of operation of the tape-transport mechanism. The function of the control network required to perform the remaining two operations, namely, moving the film in a reverse direction after last moving in a reverse direction, and moving the film in a forward direction after last moving in a reverse direction, may be readily understood by tracing the sequence of events in Figure 5 in a similar manner to that just described.

Another important function of control network 72 is that of actuating the record-drive mechanism 54 in the proper direction so as to always record the timing data on the correct area on the tape. It will be recalled that, if the film had last been moved in a forward direction as the conducting strip passed over the split roller 74, the area of tape to be recorded upon would lie between the record head 44 and the upper erase head 46. This condition required that the record-drive mechanism 54 be rotated in a clockwise direction so as to erase the area on the tape before recording the new timing data. The reverse of the above situation would require the opposite rotation of the record-drive mechanism.

Referring to Figure 5, if the film had last been moved in a forward direction as the conducting strip passed over the split roller 74, the left side of flip-flop 104 will have been energized by a pulse from the split roller 74 that has been differentiated by differentiating circuit 94 and passed by gate 106, which has been held open by a voltage from the left side of direction flip-flop 136. The voltage from the left side of flip-flop 104 opens the clockwise gate 102. When the record button 68 is pressed, a pulse from the differentiating circuit 92 triggers a one-shot multivibrator 98. This pulse passes through the open clockwise gate 102 and energizes the clockwise single-revolution clutch in the record-drive mechanism 54. The pulse from the one-shot multivibrator 98 is long enough to permit a complete cycle of operation of the record-drive mechanism 54 without the operator holding down the record button 68 continuously. If the film had last been moved in a reverse direction as a conducting strip passed over the split roller 74, it may be seen from Figure 5 that the opposite action would take place, and the counterclockwise single-revolution clutch of the record-drive mechanism 54 would be energized.

A further function of the control network 72 is to provide a pulse from the split roller 74 through the differentiating circuit 94 to reset the relay-operating flip-flops 82 in Figure 2 immediately before new information is read into them from the tape. A similar reset pulse is generated through the differentiating circuit 90 when the operating switch 45 is in the playback position and the record button 68 is pressed. This is used when repeated readout is desired from a given area on the tape.

Still a further function of control network 72 is to provide voltages to erase gates 64 and 66 in accordance with the desired direction of movement of record-drive mechanism 54, such that the area of tape that is to be recorded upon is erased immediately before recording. These voltages are provided by opposite sides of flip-flop 104, as shown in Figure 5.

Figure 6 is a diagrammatic perspective view of the tape-advancing mechanism and shows the section of the tape 46 and a two-sprocket hole advance solenoid 50A, a four-sprocket hole advance solenoid 50B. The tape runs over a sprocketed and rotatably supported wheel 51. This wheel is on a shaft 53, which has on it a ratchet wheel 55. Solenoid 50A has a pawl 57, which it carries with it when energized through a revolution. In revolving, it rotates the pawl sufficiently to move the tape two sprocket holes. Solenoid 50B, which is also a rotary solenoid, likewise has a pawl 59, which is actuated through a lever 61, which is mounted on a pivotal support 63. When solenoid 50B is operated, it actuates the lever 61, which in turn moves the pawl 59 to advance the sprocket wheel sufficiently so that the tape is advanced through four sprocket holes. The apparatus 52A, 52B required to reverse the tape motion is the same as shown.

A tape bearing printer-light recorded data may be removed and subsequently read to control a printer-light lamp for positive stock exposure. Such control may be made using flip-flops and relays in the manner described for controlling the photo-tube operating potential. Such control may also be employed for inserting one of a number of filters in a light path or operating a variable diaphragm in a light path.

There has accordingly been described and shown herein a novel, useful improvement in printing-timer apparatus whereby data corresponding to the proper printing-light exposure time may be recorded and subsequently such recording may be rechecked and employed to operate other apparatus automatically. Although the variation of the printing-light control is afforded here by varying the operating potentials applied to the phototube, it will be understood and appreciated that the other systems described, which use a potentiometric control, may similarly be varied automatically, as well as provide different level settings for recording the settings of the printer light for the proper exposure.

We claim:

1. In a printing-timer apparatus of the type wherein electrical signals representative of point-by-point light transmission of color-image-aspect negatives of an object are applied to associated color channels and a positive picture in color is displayed by cathode-ray tube apparatus driven responsive to output from said color channels, the improvement in each channel comprising means for varying the brightness of the corresponding color in said positive picture, means for encoding different color brightness levels throughout the range of said means for varying, and means for recording the code for a level when said positive picture has a desired color brightness.

2. In a printing-timer apparatus of the type wherein electrical signals representative of point-by-point light transmission of color-image-aspect negatives of an object are applied to associated color channels and a positive picture in color is displayed by cathode-ray tube apparatus driven responsive to output from said color channels, the improvement in each channel comprising means in each channel for varying the average level of said electrical signals to vary the brightness of the corresponding color in said positive picture, means for encoding different average levels throughout the range of said means for varying, and means for recording the code for a level when said positive picture has a desired color brightness.

3. In a printing-timer apparatus of a type wherein for each of a plurality of color channels there is a means for generating electrical signals responsive to the point-by-point light transmission of a color-image-aspect negative of an object and there is cathode-ray tube apparatus at the outputs of said plurality of channels for displaying a positive picture in color of said object, the improvement in each channel of said apparatus comprising means for varying the response level of said means for generating to vary the color brightness of the image displayed on said cathode-ray tube apparatus, means for digitally encoding each response level over the range of said means for varying, a storage medium, means for recording on said storage medium the digital code for a desired selected response level, and means for setting the level of said means for varying responsive to the digital code recorded on said storage medium.

4. In a printing-timer apparatus as recited in claim 3 wherein said means for generating electrical signals includes a phototube, means for applying operating potentials to said phototube, and said means for varying the average response level includes means for changing the operating potentials applied to said phototube.

5. In a printing-timer apparatus of a type wherein for each of a plurality of color channels there is a phototube having a source of operating potentials therefor, each said phototube providing electrical signals representative of point-by-point transmission of light from a color-image-aspect negative of an object, and there is included cathode-ray tube apparatus which, responsive to the output of said color channels displays a positive picture in color of said object, the improvement in each channel comprising means for selectively varying the operating potentials applied to said phototube to vary its response, means for encoding each setting of said means for selectively varying operating potentials, means for recording output from said means for encoding, means for reading the data recorded by said means for recording, and means responsive to said means for reading for varying the operating potentials applied to said phototube accordingly.

6. In a printing-timer apparatus of a type wherein for each of a plurality of color channels there is a phototube having a source of operating potentials therefor, each said phototube providing electrical signals representative of point-by-point transmission of light from a color-image-aspect negative of an object and there is included cathode-ray tube apparatus which responsive to the output of said color channels displays a positive picture in color of said object, the improvement in each channel comprising means for selectively varying the operating potentials applied to said phototube to vary its response including a plurality of relays, a plurality of selector switches, means for connecting said selector switches to said relays to establish a unique pattern of operated and unoperated relays for each different setting of said selector switches, means for establishing different operating potentials for said phototube responsive to each unique operated and unoperated relay pattern, a recording medium, means for recording on said medium a representation of each said unique relay pattern, means for reading said recorded representation, and means responsive to said means for reading for establishing said plurality of relays in the unique pattern which was recorded.

7. The system recited in claim 6 wherein said means for establishing different operating potentials for said phototube responsive to each unique operated and unoperated relay pattern includes a source of operating potential for said phototube, a source of reference potential, a plurality of resistors interconnected between said reference potential and said source of operating potential, and means including contacts on each relay for selectively withdrawing and inserting said resistors into said interconnection responsive to each said relay being operated or not.

8. The system recited in claim 6 wherein said means for recording on said medium a representation of each said unique relay pattern includes a pair of contacts on each relay, a source of oscillations connected to one of the said pairs of contacts, a plurality of recording heads, and means for connecting a different one of said reading heads to a different one of the other of each of said pairs of relay contacts.

9. In a printing-timer apparatus for reels of motion-picture negative film having thereon an indication of scene changes, said printing-timer apparatus being of a type wherein for each of a plurality of color channels there is a phototube having its own source of operating potentials, each said phototube providing electrical signals representative of point-by-point transmission of light from a color-image-aspect negative frame, and there is included cathode-ray tube apparatus at the output of all said color channels for presenting a positive in color responsive to signals from said channels, the improvement in each channel of said printing-timer apparatus comprising means for selectively varying the operating potentials applied to said phototube to vary its response, means for encoding each setting of said means for selectively varying operating potentials, means for recording output from said means for encoding including a recording medium, means for recording on said medium, means for sensing changes of scene in said motion-picture negative film, and means for moving said recording medium each time a scene change is sensed by said means to provide a fresh recording space under said means for recording on said medium.

10. In a printing-timer apparatus for reels of motion-picture negative film having an indication of scene changes thereon said printing-timer apparatus being of a type wherein for each of a plurality of color channels there is a phototube having its own source of operating potentials, each said phototube providing electrical signals representative of point-by-point transmission of light from a color-image-aspect negative frame, and there is included cathode-ray tube apparatus at the output of all said color channels for presenting a positive in color responsive to signals from said channels, the improvement in each channel of said printing-timer apparatus comprising means for selectively varying the operating potentials applied to said phototube to vary its response, means for encoding each setting of said means for selectively varying operating potentials, means for recording output from said means for encoding including a recording medium, means for recording on said medium, means for sensing changes of scene in said motion-picture negative film, means for moving said recording medium each time a scene change is sensed by said means to provide a fresh recording space under said means for recording on said medium, means for reading what is recorded on said recording medium, means for controlling said means for selectively varying said operating potentials responsive to output from said means for reading, and means for moving said recording medium in reverse responsive to a scene change being sensed to pass the recorded coding for the next scene under said means for reading.

References Cited in the file of this patent

UNITED STATES PATENTS

| | | |
|---|---|---|
| 2,279,018 | Wolfe | Apr. 7, 1942 |
| 2,790,844 | Neugebauer | Apr. 30, 1957 |